Aug. 15, 1933.  A. E. L. CHORLTON  1,922,197
VEHICLE SUBSTRUCTURE
Filed Aug. 30, 1928   3 Sheets-Sheet 3
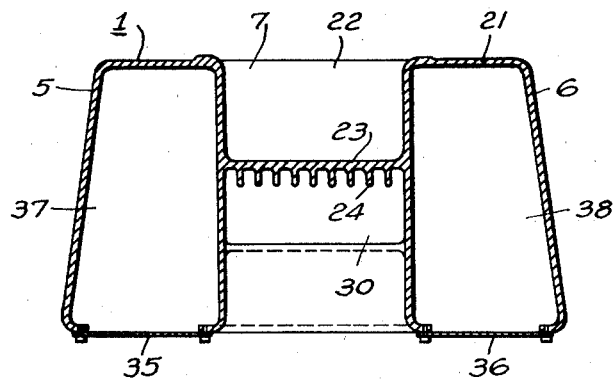
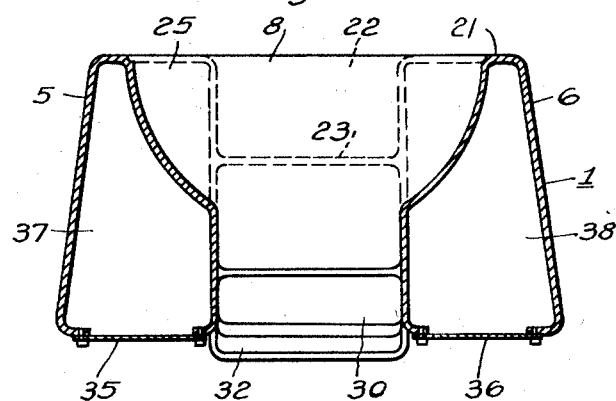
INVENTOR
Alan E. L. Chorlton.
BY
ATTORNEY Patented Aug. 15, 1933

1,922,197

UNITED STATES PATENT OFFICE 1,922,197

VEHICLE SUBSTRUCTURE

Alan Ernest Leofric Chorlton, London, England

Application August 30, 1928. Serial No. 302,934

6 Claims. (Cl. 105—35)

My invention relates generally to railway vehicles and in particular to supporting beds or frame structures for self-propelled railway vehicles.

Heretofore, railway vehicles of the self-propelled type have been constructed in a manner very similar to ordinary railway coaches, and the prime movers utilized for propelling them have been mounted on under-bed members supported on the floor of each car near one end.

The present invention provides a frame structure for the forward portion of a self-propelled railway car that has formed integrally with it an under-bed for supporting an engine and an electric generator.

It is an object of my invention to provide a unitary frame structure and under-bed member for a self-propelled railway vehicle that is of sturdy and simple construction.

A further object of my invention is to provide, in a unitary structure, a portion of the frame of a vehicle and the under-bed for a prime mover, which is provided with a sump for an engine and tanks for storing oil or other liquid.

Figure 1:
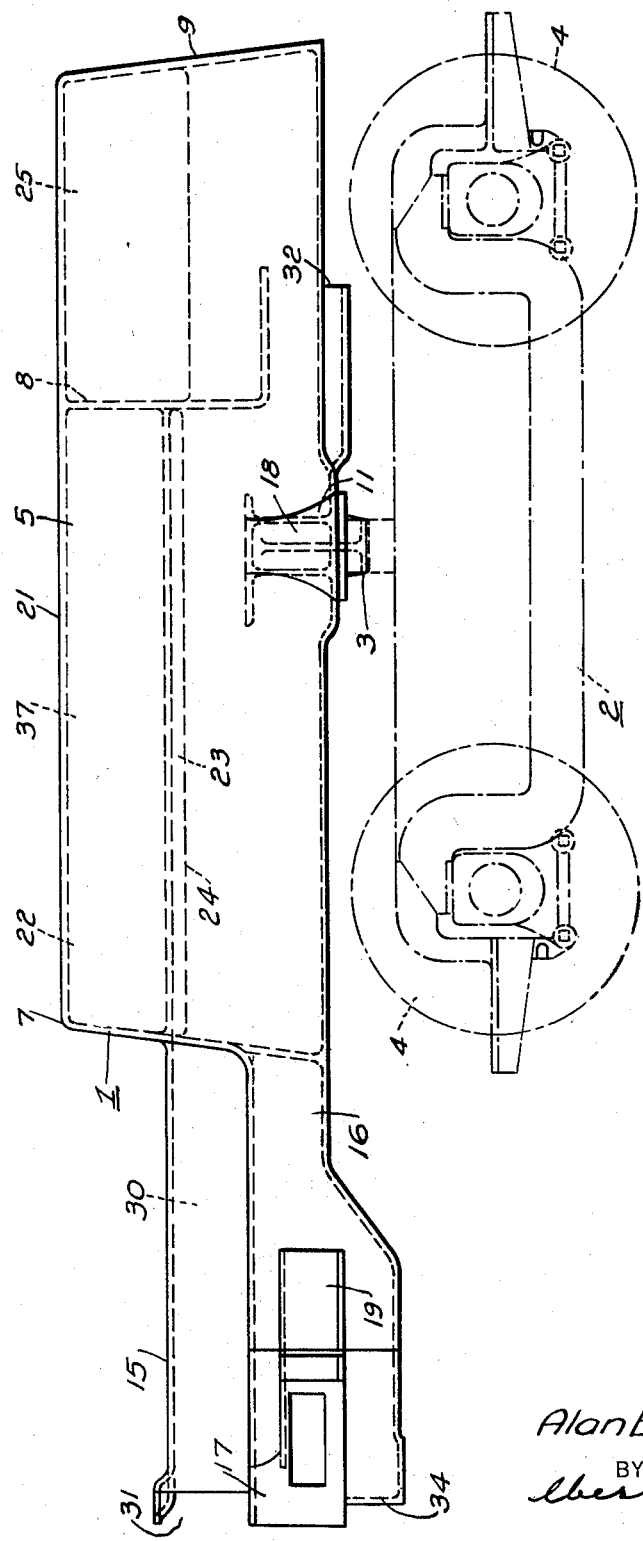
Figure 2:
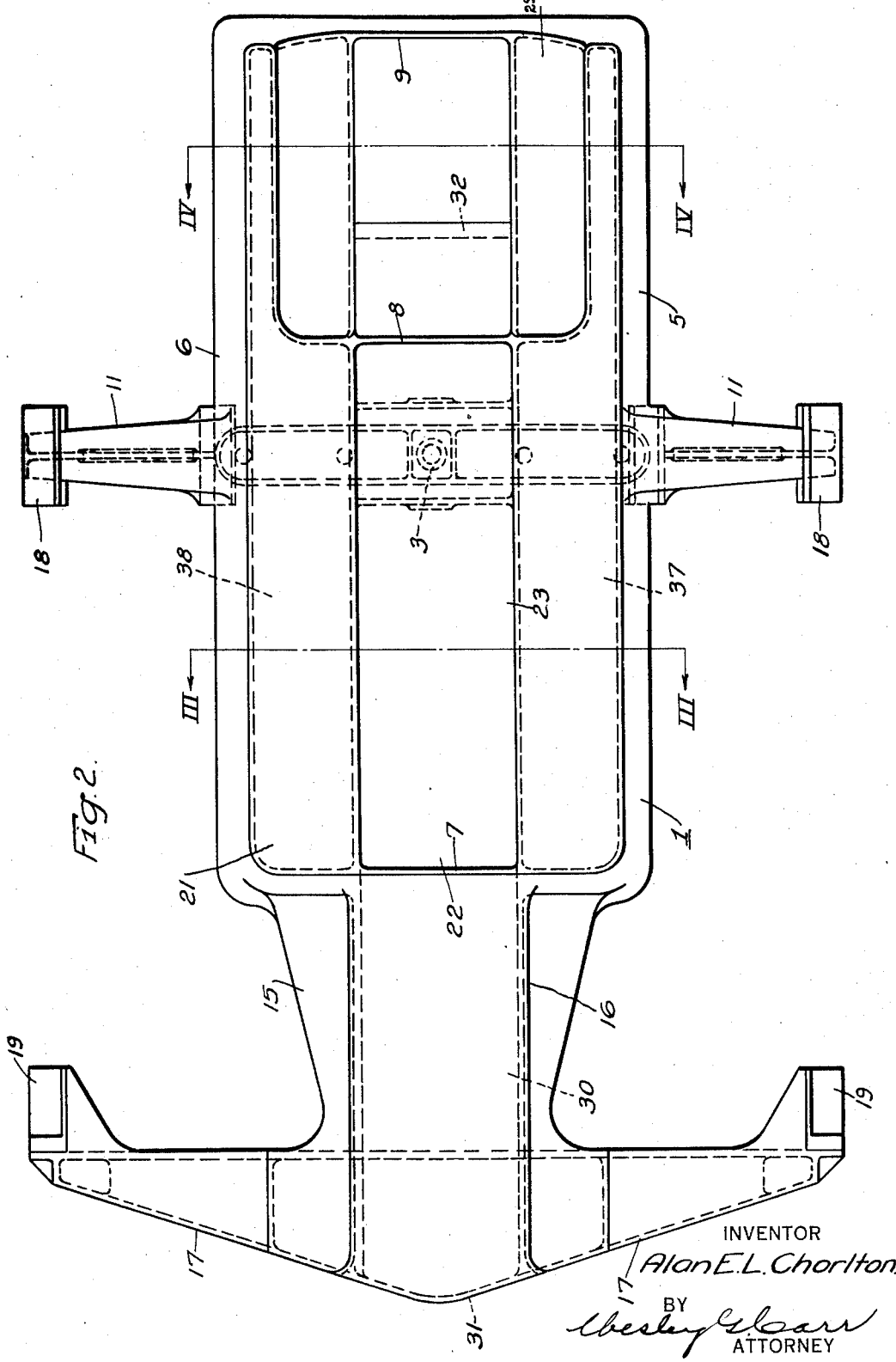

Other objects of my invention will become apparent as the following description of the frame structure is read in conjunction with the accompanying drawings, in which Figure 1 is a view, in side elevation, of a portion of a railway vehicle showing the frame structure embodying the invention, Fig. 2 is a plan view of the frame structure shown in Fig. 1, Fig. 3 is a view, in cross-section, of a frame structure taken along the line III—III of Fig. 2, and Fig. 4 is a similar view, in cross-section, taken along the line IV—IV of Fig. 2.

Referring to the drawings, the forward portion of a railway vehicle that is shown in Fig. 1 comprises a unitary frame structure and under-bed member 1 that is carried on a swivel truck 2 by means of the usual center-pin connection 3. As shown diagrammatically, the supporting truck structure 2 may be provided with flanged wheels 4 and with electric motors for driving the vehicles in the usual manner.

In order that the frame structure 1 may be made as rigid as possible and of minimum weight, the main body portion is made up of a pair of spaced, longitudinally disposed side members or channels 5 and 6 that are of inverted U-shape in cross-section, constituting hollow cast box frame members, as shown in Figs. 3 and 4.

The side-frame members 5 and 6 are joined together by integral transverse diaphragms 7, 8 and 9 that are disposed at the forward end, the intermediate portion and the rear of the side-frame members. The whole structure is supported on the center pin 3 by means of a transverse member that is formed integrally with, and disposed below, the side-frame members 5 and 6 and extends on each side of the frame 1 to constitute a body bolster 11.

At the forward end of the frame member 1, a platform 15 is provided on the upper surface of a centrally disposed projection or bumper frame 16 that is formed integrally with the side-frame members 5 and 6 in such manner that it constitutes the forward portion of the vehicle and serves to support an integral cross member that constitutes the car end beam or bumper 17.

To provide means for mounting a car body on the frame 1, pairs of bracket members 18 and 19 are provided on the ends of the bolster 11 and the bumper 17, respectively.

In order that the weight of the heavy equipment to be carried by the car may be properly distributed, the upper portion of the frame member 1, that is symmetrically disposed with respect to the center pin 3, constitutes an equipment deck 21 upon which may be mounted a heavy prime mover, such as a Diesel engine, and an electrical generator (not shown). To facilitate the mounting of this equipment, the forward portion of the equipment deck 21 is designed to provide a crank case or oil sump 22 for receiving the engine.

The oil sump 22 is formed by providing a rectangular depression between the side-frame members 5 and 6 and the transverse diaphragms 7 and 8 that is closed at the bottom by a diaphragm or partition 23 which is provided with downwardly extending cooling fins 24.

The rear portion of the equipment deck 21 constitutes a base for receiving an electric generator and is formed by providing a substantially semicylindrical depression or compartment 25 between the side-frame members 5 and 6 and the transverse diaphragms 8 and 9, in such manner that the generator may be mounted in proper alignment with the engine which may be mounted in the sump portion 22.

In order that the engine sump 22 may be adequately cooled, the cooling fins 24, extending from the diaphragm 23 that constitutes the bottom of the sump 22, project into an air duct 30 that is disposed longitudinally of the frame member 1 between the side-frame members 5 and 6. The air duct 30 extends forward through the bumper frame 16 beneath the platform 15 and terminates in an opening 31 just above the bumper 17. At its other end, the duct 30 terminates in an opening 32 beneath the generator compartment 25 in such manner that, when the railway vehicle is moving forward, air will be forced in the opening 31 through the duct 30 and out of the opening 32.

To provide means for receiving the usual drawbar mechanism, a pocket 34 is provided in the bumper frame member 16 below the bumper 17. As a further economy in space, the hollow interiors of the side-frame members 5 and 6 may be utilized for the storage of oil and water or other material by providing closure plates 35 and 36 that constitute the bottoms of tanks 37 and 38, as shown in Figs. 3 and 4.

From the foregoing explanation, it will be readily apparent that my invention provides a simple and rugged frame member and under-bed portion for a self-propelled railway vehicle.

Although I have described a specific embodiment of the invention, it will be obvious to those skilled in the art that modifications may be made in the details of construction and in the proportions of the various members of the frame structure without departing from the spirit and scope of the invention, as defined in the appended claims.

I claim as my invention:

1. An under-bed for a Diesel-electric generating set that comprises an integral casting for supporting an engine and a generator, said casting being provided with a pair of tanks for fuel and water that constitute the sides of a sump for the engine and a compartment for the generator.

2. A railway vehicle comprising a truck structure having a center-pin connection, an integral frame portion and power-unit under-bed mounted on the center-pin connection, said integral frame portion comprising body-bolster members for supporting a car body, an engine sump formed in the upper surface thereof, a generator compartment in alignment with the engine sump, tank portion formed on the sides of the engine sump, a platform extending forward from the engine sump and a bumper portion formed across the end of the platform.

3. An under-bed for the power unit of a railway vehicle comprising an integral casting having a center-pin connection disposed to engage a supporting-truck structure, said integral casting comprising an engine sump disposed longitudinally thereof, a generator compartment disposed in alignment with the engine sump, a cooling air duct beneath the engine sump, tanks on the respective sides of the engine sump and generator compartment, body bolster members extending transversely from the tank portion, a platform in front of the engine sump and a bumper portion that constitutes the forward edge of the platform.

4. An integral railway-vehicle-frame structure, comprising a pair of box side portions that constitute tanks, an engine sump disposed between the side portions, the ends of the side portions being formed to provide a substantial cylindrical depression for receiving a generator, said depression being in alignment with the engine sump, a platform portion formed in front of the engine sump, means for mounting the frame structure on a wheeled truck and means for mounting a car body on the frame structure.

5. A frame for railway vehicles comprising a pair of side portions of box shape in cross section, an integral end portion for connecting the side portions, said end portion constituting a platform, a bumper portion formed integrally with the end portion, an engine sump disposed between the side portions and having its bottom portion substantially level with the top of the platform portion, said platform portion and bumper being provided with a passageway for directing a stream of air against the bottom of the engine sump.

6. In a frame for railway vehicles, in combination, a platform portion, a bumper portion formed integrally with the platform portion, an engine sump also formed integrally with the platform portion, a generator-supporting portion having a cylindrically shaped depression for receiving a generator in alignment with the engine sump and a pair of tank portions disposed parallel thereto and constituting the sides of the engine sump and generator supporting portion.

ALAN ERNEST LEOFRIC CHORLTON.